(12) United States Patent
Tatman et al.

(10) Patent No.: US 8,919,134 B2
(45) Date of Patent: Dec. 30, 2014

(54) INTERSHAFT SEAL WITH SUPPORT LINKAGE

(75) Inventors: Neil L. Tatman, Brentwood, NH (US); Christopher J. Larson, Newfield, ME (US)

(73) Assignee: United Technologies Corporation, Hartford, CT (US)

( * ) Notice: Subject to any disclaimer, the term of this patent is extended or adjusted under 35 U.S.C. 154(b) by 1010 days.

(21) Appl. No.: 13/013,885

(22) Filed: Jan. 26, 2011

(65) Prior Publication Data

US 2012/0186270 A1 Jul. 26, 2012

(51) Int. Cl.
*F02C 7/20* (2006.01)
*F04D 29/10* (2006.01)
*F01D 11/00* (2006.01)
*F01D 25/16* (2006.01)
*F01D 25/18* (2006.01)
*F02C 7/28* (2006.01)
*F02C 7/36* (2006.01)

(52) U.S. Cl.
CPC ............ *F01D 11/003* (2013.01); *F01D 25/162* (2013.01); *F01D 25/183* (2013.01); *F02C 7/28* (2013.01); *F02C 7/36* (2013.01); *F05D 2240/55* (2013.01)

USPC .................. 60/796; 60/797; 60/798; 415/230

(58) Field of Classification Search
CPC ............. F02C 7/20; F23R 3/60; F01D 9/023; F15M 5/00; F16F 15/08; H02K 5/26; H02K 5/00; F16M 7/00; B41J 29/04; B60D 27/26; B60D 27/18; F04D 29/106; F04D 29/126
USPC ............. 60/796, 797, 798; 24/637, 639, 645, 24/672–674, 677; 244/54; 415/230
See application file for complete search history.

(56) References Cited

U.S. PATENT DOCUMENTS

| | | | |
|---|---|---|---|
| 3,397,855 A * | 8/1968 | Newland | 248/554 |
| 6,059,227 A * | 5/2000 | Le Blaye et al. | 244/54 |
| 6,132,168 A | 10/2000 | Kovaleski et al. | |
| 6,196,790 B1 * | 3/2001 | Sheridan et al. | 415/111 |
| 6,775,985 B2 * | 8/2004 | Mitchell et al. | 60/772 |
| 7,373,780 B2 | 5/2008 | Peters et al. | |

* cited by examiner

*Primary Examiner* — Andrew Nguyen
*Assistant Examiner* — Jared W Pike
(74) *Attorney, Agent, or Firm* — Kinney & Lange, P.A.

(57) ABSTRACT

An assembly for gas turbine engine includes a cross-over housing, an inter-shaft seal housing, and a linkage. The inter-shaft seal housing is disposed within the cross-over housing. The linkage is connected to the inter-shaft seal housing and extends through a slot in the cross-over housing. The linkage is removable from both the inner radial housing and the outer radial housing.

8 Claims, 3 Drawing Sheets

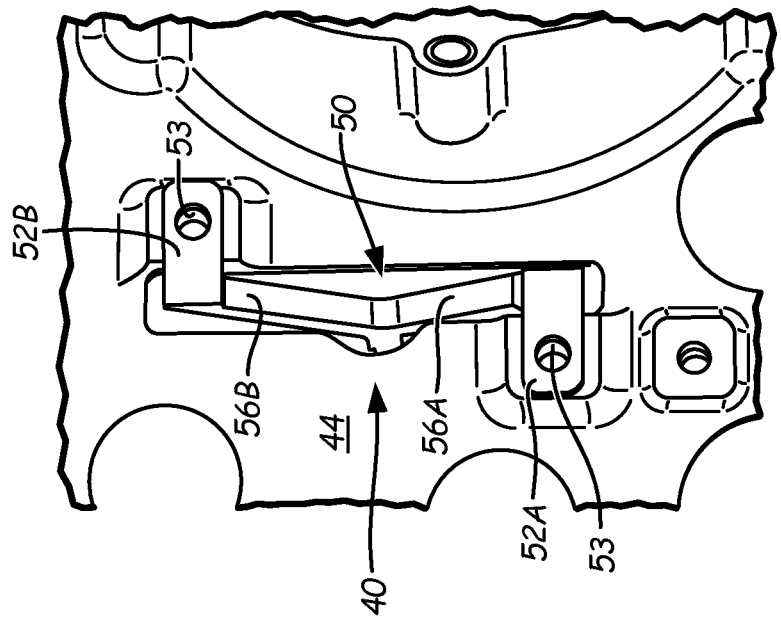
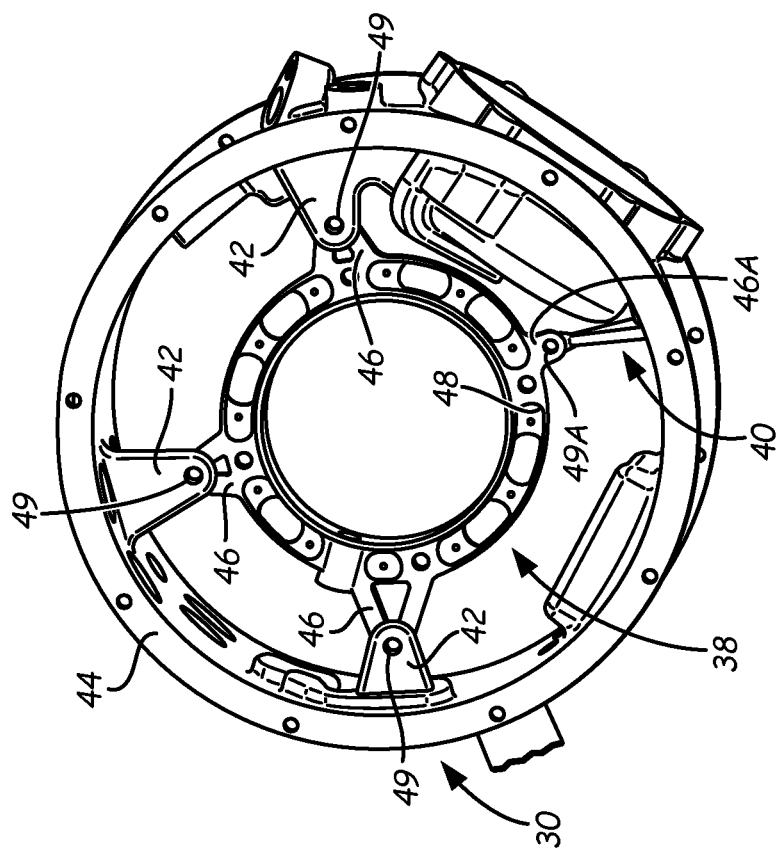
Fig. 2B
Fig. 2A

# INTERSHAFT SEAL WITH SUPPORT LINKAGE

STATEMENT OF GOVERNMENT INTEREST

This invention was made with United States government support under government contract. The government has certain rights in the invention.

BACKGROUND

The present invention relates to gas turbine engines, and more particularly, to bearing compartments of gas turbine engines.

The rotating shafts and other rotating turbomachinery of gas turbine engines are supported from a non-rotating structure by arrays of anti-friction bearings. In many engines, the anti-friction bearings are enclosed in bearing compartments that circumscribe the engine shafts. A lubricant such as oil is supplied to the bearing compartments to lubricate and cool the anti-friction bearings during operation of the gas turbine engine. The bearing compartments act to contain the lubricant around the bearings.

To prevent overheating of the rotating shafts, a cooling gas is circulated in the volume between the shafts. An intershaft seal assembly is positioned in the bearing compartment at a gap between the shafts and prevents the cooling gas from leaking from between the shafts into the lubricant supplied portions of the bearing compartments. The intershaft seal additionally prevents the lubricant from leaking into the volume between the shafts.

Carbon seals that make up portions of the inter-shaft seal assembly are retained within the bearing compartment by a carbon seal housing, which in turn is connected to other housings within the bearing compartment. To meet structural integrity requirements, the carbon seal housing uses rigid integral linkages to provide this connection. However, having integral linkages makes installation and removal of the inter-shaft seal assembly including the carbon seal housing impractical or impossible in the bearing compartments of some aircraft due to the tight bearing envelopes necessitated by the aircraft's design criteria.

SUMMARY

An assembly for gas turbine engine includes a cross-over housing, an inter-shaft seal housing, and a linkage. The inter-shaft seal housing is disposed within the cross-over housing. The linkage is connected to the inter-shaft seal housing and extends through a slot in the cross-over housing. The linkage is removable from both the inner radial housing and the outer radial housing.

In another aspect, the linkage has a first, second, and third brackets and first and second legs. The first and second legs intersect one another and are connected to the first bracket. The first leg and the second leg substantially align along a common plane. The second bracket extends from a distal portion of the first leg and a third bracket extends from a distal portion of the second leg. The second bracket and the third bracket are orientated so as to extend in opposite directions from one another in substantially a same plane.

BRIEF DESCRIPTION OF THE DRAWINGS

FIG. 2A is a perspective view of a portion of a cross-over housing, a carbon seal housing, and a removable linkage from the mid-bearing compartment.

FIG. 2B is a perspective view of a portion of the cross-over housing from FIG. 2A showing a slot receiving the removable linkage.

DETAILED DESCRIPTION

Figure 1:
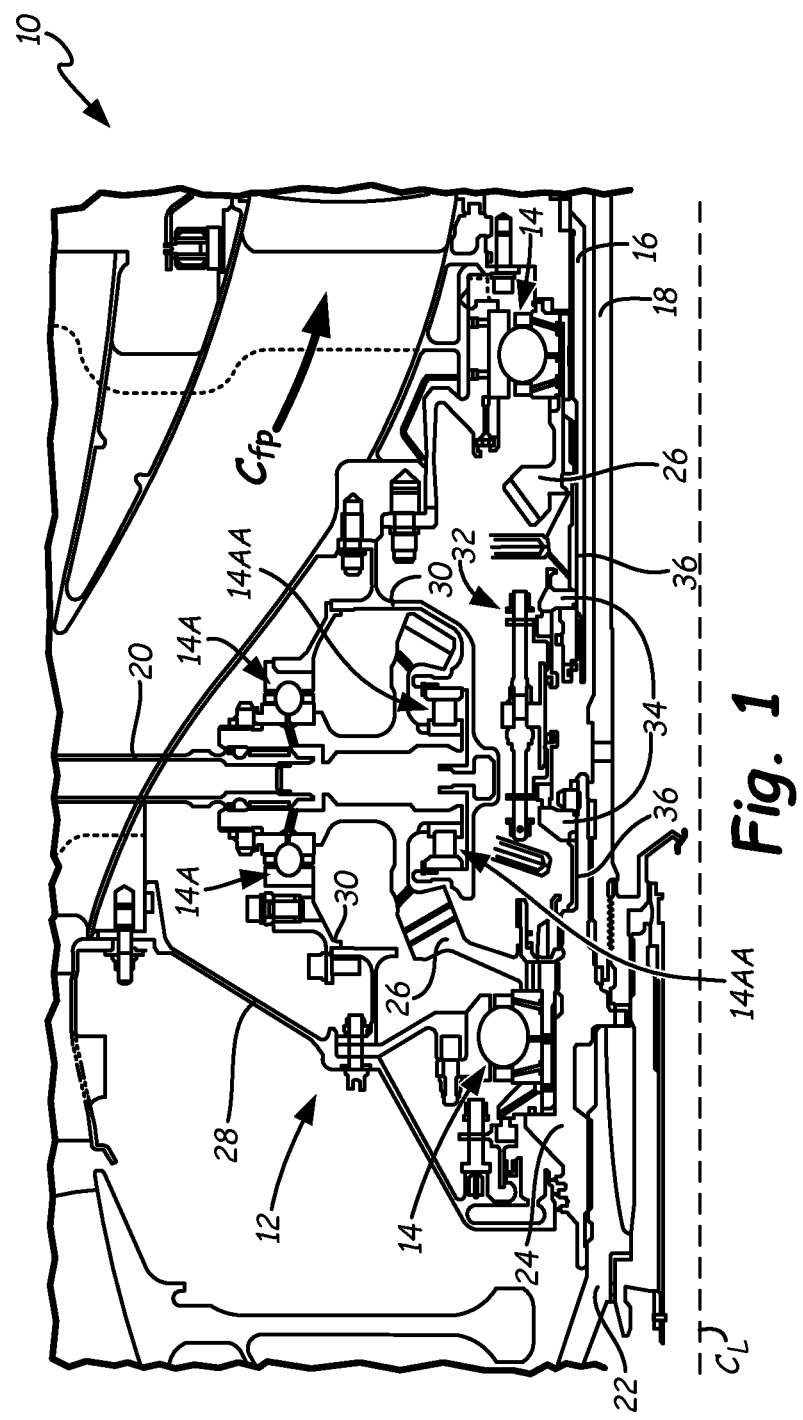
FIG. 1 is a cross-sectional view of a mid-bearing compartment of a gas turbine engine.

FIG. 1 shows a portion of gas turbine engine 10 above engine centerline $C_L$. Gas turbine engine 10 includes a bearing compartment 12, bearings 14, 14A, and 14AA, a high pressure compressor shaft 16, a low pressure turbine shaft 18, tower shafts 20, a fan shaft 22, a coupling 24, bevel gears 26, an outer housing 28, a cross-over housing 30, an inter-shaft seal assembly 32, seats (plates) 34, spacers 36, and a core flow path $C_{fp}$.

The bearing compartment 12 in the illustrated embodiment is the mid-bearing compartment of the gas turbine engine 10. The bearing compartment 12 houses the bearings 14, 14A and 14AA, which are disposed around and support the high pressure compressor shaft 16, the low pressure turbine shaft 18, the tower shafts 20 (only a single low spool tower shaft is shown in FIG. 1) and the fan shaft 22. In particular, the bearings 14 support the high pressure compressor shaft 16, the low pressure turbine shaft 18, and the fan shaft 22. The bearings 14A and 14AA support the tower shafts 20. The high pressure compressor shaft 16 is disposed radially outward of and spaced apart from the low pressure turbine shaft 18. The coupling 24 connects the fan shaft 22 to the tower shafts 20 via the bevel gears 26. The outer housing 28 extends annularly around and is disposed axially forward of components such as the bearings 14 and tower shafts 20. The outer housing (also called a bearing support or front cover) 28 extends radially from adjacent the casing that defines the core flow path $C_{fp}$ to interface with the coupling 24, and additionally connects to the cross-over housing 30. The cross-over housing 30 extends from the outer housing 28 and interfaces and supports the bearing sets 14A and 14AA disposed around the tower shafts 20. The inter-shaft seal assembly 32 is disposed radially inward of the cross-over housing 30 and axially between the coupling 24 and the high pressure compressor shaft 16. The inter-shaft seal assembly 32 interfaces with the seats (also called seal runners) 34. The seats 34 are axially abutted by the spacers 36, and the seats 34 and spacers 36 are disposed radially along the outer diameter of the high pressure compressor shaft 16 and the coupling 24.

The operational principles of gas turbine engine 10 are well known in the art, and therefore, will not be discussed in great detail. As is known in the art, the high pressure compressor shaft 16 connects a high pressure compressor section of the gas turbine engine 10 with a high pressure turbine section of the engine 10. Together the high pressure compressor shaft 16, the high pressure compressor section, and the high pressure turbine section comprise a high pressure spool of the engine 10. Similarly, the low pressure turbine shaft 18 connects a fan section (via the fan shaft 22) with a low pressure compressor section and a low pressure turbine section of the engine 10. Together these sections and components comprise a low pressure spool of the engine 10. During operation of the gas turbine engine 10, a gas flow passes through core flow path $C_{fp}$ to rotate the high pressure and low pressure spools to extract energy from the gas flow and produce thrust. Additionally, gas flow bypasses the core flow path $C_{fp}$ and rotates the fan to extract additional energy and thrust from the gas flow passing through a nacelle portion of the engine 10.

The bearing compartment 12 circumscribes the shafts 16, 18, and 22 and bearings 14, 14A, and 14AA and acts to contain a lubricant oil that is supplied to the bearing compartment 12 to lubricate and cool the bearings 14, 14A, 14AA, during operation of the gas turbine engine 10. The bearings 14 support the high pressure compressor shaft 16, the low pressure turbine shaft 18, and the fan shaft 24 (also called a stub shaft) and allow the shafts 16, 18, and 22 to rotate relative to the stator engine casing. Similarly, the bearings 14A and 14AA support the tower shafts 20 and allow the tower shafts 20 to rotate relative to the stator engine casing.

As will be discussed in further detail subsequently, the cross-over housing 30 supports the inter-shaft seal assembly 32. The structure and operational principles of the inter-shaft seal assembly 32 are well know in the art and is described, for example in U.S. Pat. No. 6,196,790 to Sheridan et al., which is incorporated herein by reference. The inter-shaft seal assembly 32 prevents a cooling gas circulated between the shafts 16 and 18 from leaking into the lubricant supplied portions of the bearing compartment 12. Additionally, the inter-shaft seal assembly 32 prevents the lubricant from leaking into the volume between the shafts 16 and 18. To accomplish this, the inter-shaft seal assembly 32 has carbon seals that are biased to ride against the seats 34, which are also constructed of carbon material. The spacer 36 abuts the seats 34 to provide necessary spacing between the rearward bearing 14 and the coupling 24.

FIG. 2A shows a perspective view of a portion of the cross-over housing 30. Additionally, FIG. 2A shows a carbon seal housing 38 that is part of the inter-shaft seal assembly 32 (FIG. 1). The other components of the inter-shaft seal assembly 32, the bearing compartment 12, and the shafts 16 and 18 are removed in FIG. 2A to better illustrate the carbon seal housing 38 and a removable linkage 40. The cross-over housing 30 includes integral tabs 42 and main body 44. The carbon seal housing 38, which is also the inter-shaft seal housing, includes integral tabs 46, and a flange portion 48. The integral tabs 42 and 46 include mounting holes 49.

As shown in FIG. 2A, the cross-over housing 30 extends circumferentially so as to have an axis of symmetry that substantially aligns with centerline of the gas turbine 10. The carbon seal housing 38 is disposed radially inward of the cross-over housing 30. The removable linkage 40 and the integral tabs 42 and 46 connect the carbon seal housing 38 to the cross-over housing 30. In particular, the integral tabs 42 extend radially inward from the main body 44 of the cross-over housing 30 and each of the integral tabs 42 has a mounting hole 49 that extends therethrough. The integral tabs 42 interface with the integral tabs 46 that extend radially outward from the flange portion 48 of the carbon seal housing 38. Each of the integral tabs 46 has a mounting hole 49 that extends therethrough. The integral tabs 42 and 46 are adapted to receive fasteners in the aligned mounting holes 49 to connect together.

A smaller integral member 46A extends outward from the flange portion 48 to interface with the removable linkage 40. The removable linkage 40 and the integral member 46A are also fastened together with a fastener that is received in a mounting hole 49A. Although three pairs of the integral tabs 42 and 46 and one removable linkage 40 are shown in FIG. 2A, in other embodiments the number of integral tabs and removable linkages may vary.

FIG. 2B illustrates a portion of the cross-over housing 30 that has a slot 50 for receiving the removable linkage 40. FIG. 2B illustrates a distal portion of the removable linkage 40 that includes brackets 52A and 52B with mounting holes 53 extending therethrough. The slot 50 extends circumferentially around a portion of the main body 44 of the cross-over housing 30 and is positioned radially outward of where the integral member 46A is located. The slot 50 is sized so as to allow an upper portion of the removable linkage 40 to extend radially inward and connect with the carbon seal housing 38. The distal portion of the removable linkage 40 with the brackets 52A and 52B extend away from the slot 50 to interface with and connect to the outer circumference of the cross-over housing 30 with fasteners (not shown) received in the mounting holes 53.

The design of the cross-over housing 30, the carbon seal housing 38, and the removable linkage 40 allow for improved ease of assembly and disassembly, yet allows the resulting assembly to meet structural integrity requirements such as those with regard to vibratory response during operation of the engine 10. The removable linkage 40 can be inserted and removed though the slot 50 from a position radially outward of the cross-over housing 30 and can be secured to the outer circumference of the cross-over housing 30. Additionally, the geometry of the removable linkage 40 mistake proofs installation as the removable linkage 40 can be rotated 180 degrees and still be installed to couple with the cross-over housing 30.

Figure 3:
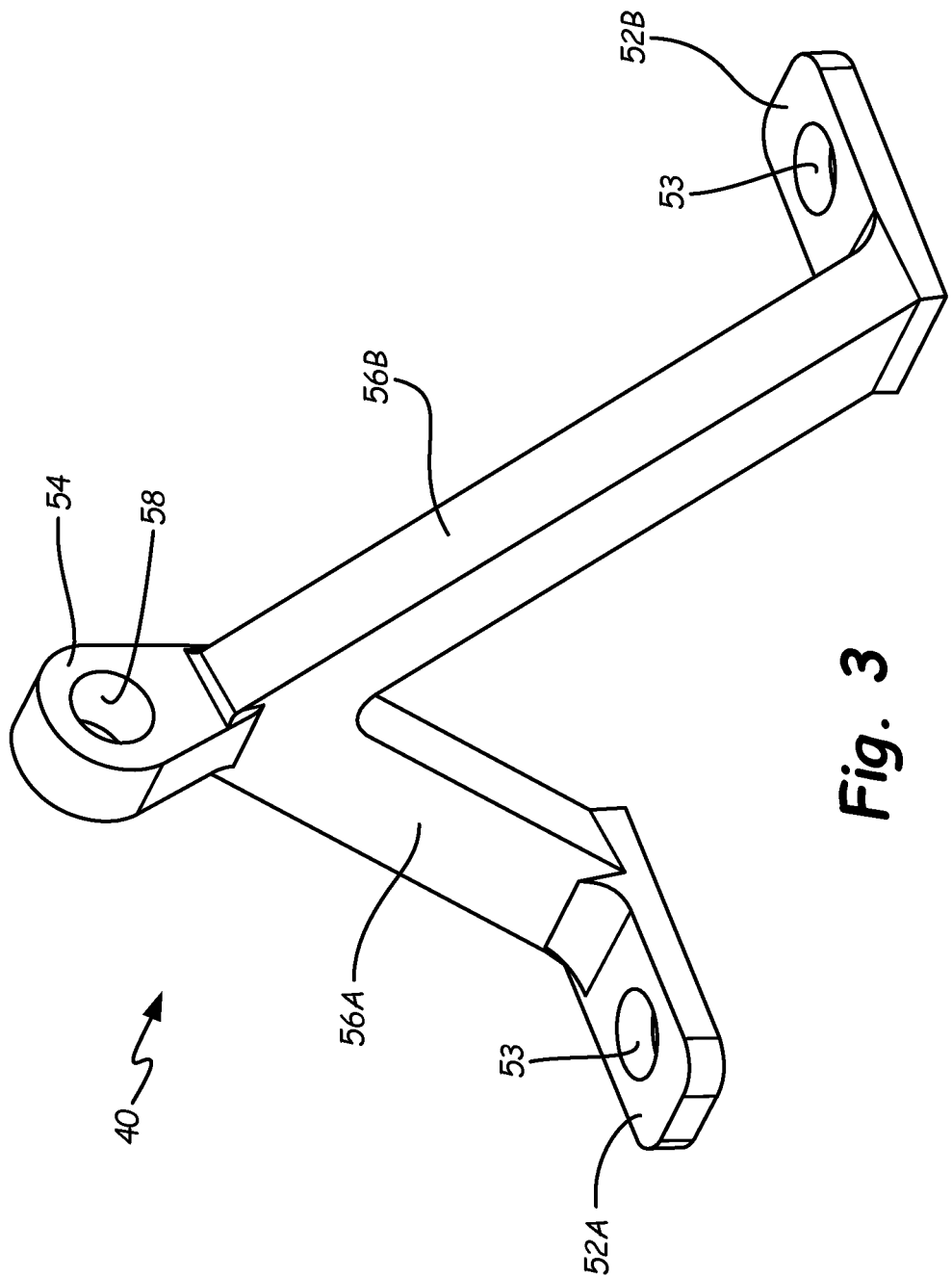
FIG. 3 is a perspective view of the removable linkage from FIGS. 2A and 2B.

FIG. 3 shows one embodiment of the removable linkage 40. In addition to the brackets 52A and 52B and mounting holes 53, the linkage 40 includes a first bracket 54, a first leg 56A, and a second leg 56B. The first bracket includes mounting holes 58.

The first bracket 54 is adapted to fit through slot 50 (FIG. 2B) and interface with the integral member 46A so that mounting holes 58 generally align with mounting holes 49A. The legs 56A and 56B intersect one another adjacent to the first bracket 54 and are connected thereto. The first leg 56A and the second leg 56B are substantially aligned along a common plane so as to extend through the slot 50 (FIG. 2B) together. The first leg 56A and the second leg 56B have symmetry with respect to a plane extending through the bracket 54.

The bracket 52A extends from a distal portion of the first leg 56A and the bracket 52B extends from a distal portion of the second leg 56B. The brackets 52A and 52B are orientated so as to extend in opposite directions from one another in substantially a same plane. This configuration allows the brackets 52A and 52B to interface with the outer circumference of the cross-over housing 30 to either side of the slot 50 and provides for improved load distribution through the removable linkage 40. The brackets 52A and 52B extend along a plane that is substantially perpendicular to plane that the first leg 56A and second leg 56B extend along. Additionally, the plane the brackets 52A and 52B extend along is substantially perpendicular to a plane along which the first bracket 54 extends.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An assembly for a gas turbine engine, comprising:
an outer radial housing having an outer surface;

an inner radial housing disposed within the outer radial housing; and a linkage connected to the inner radial housing and the outer radial housing and removable from both the inner radial housing and the outer radial housing;

a first bracket connected to the inner radial housing;

a first leg and a second leg intersecting one another and connected to the first bracket, the first leg and the second leg are substantially aligned along a common plane;

a second bracket extending from a distal portion of the first leg and a third bracket extending from a distal portion of the second leg, the second bracket and the third bracket orientated so as to extend in opposite directions from one another in substantially a same plane;

a slot in the outer radial housing extending circumferentially around a portion of the outer radial housing, wherein the first leg and the second leg both extend through the slot, and wherein the second bracket and the third bracket interface with the outer surface of the outer radial housing, are connected thereto.

2. The assembly of claim 1, wherein the inner radial housing has one or more outward extending integral tabs that connect the inner radial housing to inward extending integral tabs on the outer radial housing.

3. The assembly of claim 1, wherein each of the first, second, and third brackets are adapted with mounting holes to receive one or more fasteners to connect the linkage to the inner radial housing and the outer radial housing.

4. The assembly of claim 1, wherein the outer radial housing comprises a cross-over housing and the inner radial housing comprises an inter-shaft seal housing for the gas turbine engine.

5. The assembly of claim 1, wherein the assembly is disposed within a mid-bearing compartment of the gas turbine engine.

6. A gas turbine engine, comprising:

a cross-over housing having an outer surface;

an inter-shaft seal housing disposed within the cross-over housing; and a linkage connected to the inter-shaft seal housing and extending through a slot in the cross-over housing, the linkage removable from both an inner radial housing and an outer radial housing;

a first bracket connected to the inner radial housing;

a first leg and a second leg intersecting one another and connected to the first bracket, the first leg and the second leg are substantially aligned along a common plane;

a second bracket extending from a distal portion of the first leg and a third bracket extending from a distal portion of the second leg, the second bracket and the third bracket orientated so as to extend in opposite directions from one another in substantially a same plane;

the slot in the cross-over housing extending circumferentially around a portion of the cross-over housing, wherein the first leg and the second leg both extend through the slot, and wherein the second bracket and the third bracket interface with the outer surface of the cross-over housing, are connected thereto.

7. The gas turbine engine of claim 6, wherein the inter-shaft seal housing has one or more integral tabs that connect the inter-shaft seal housing to integral tabs on the cross-over housing.

8. The gas turbine engine of claim 6, wherein each of the first, second, and third brackets are adapted to receive one or more fasteners in mounting holes to connect the linkage to the inter-shaft seal housing and the cross-over housing.

* * * * *